Aug. 14, 1962  F. A. REECE  3,049,209
STOP MOTION
Original Filed March 18, 1954  5 Sheets-Sheet 1
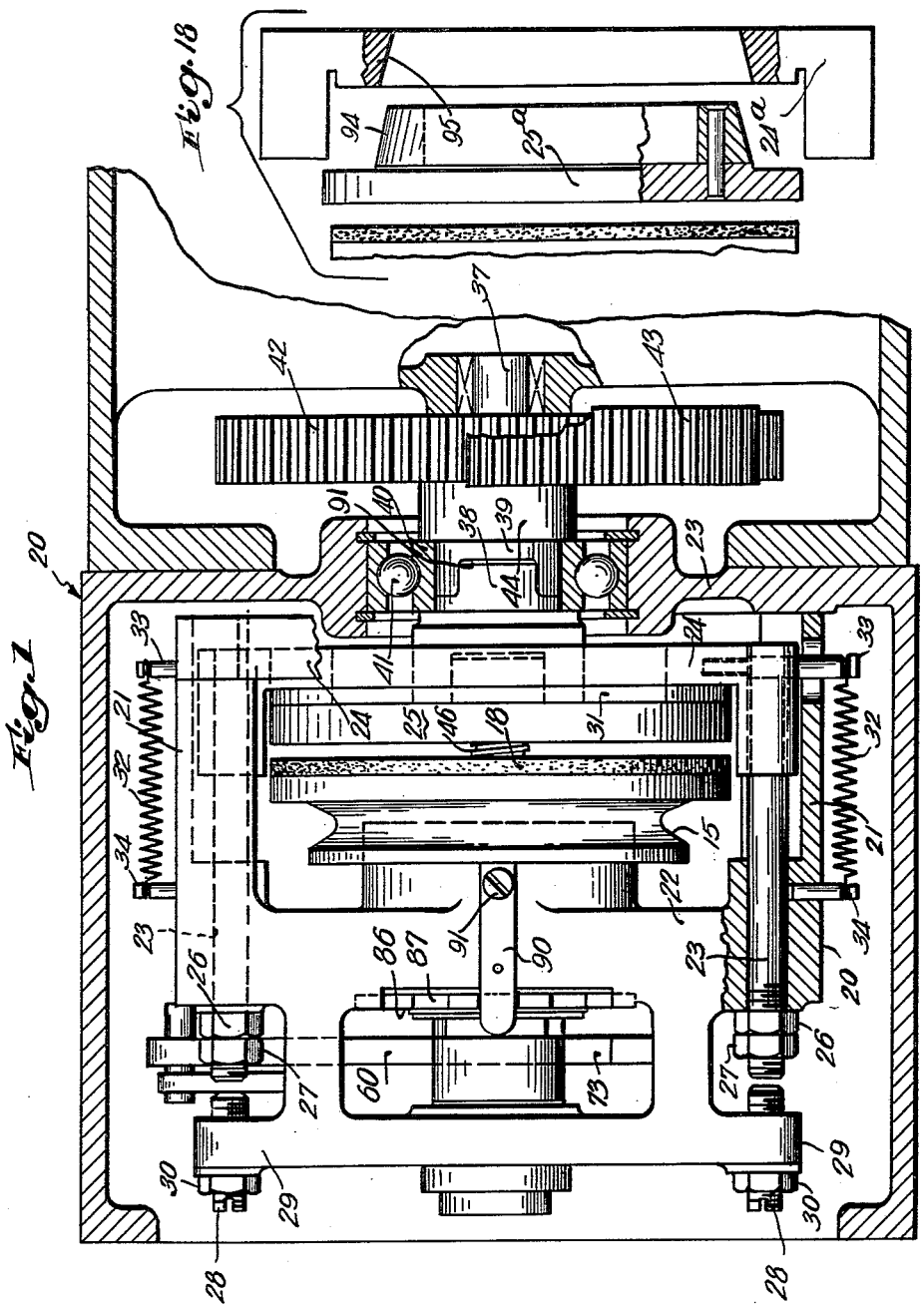
Inventor
Franklin A. Reece

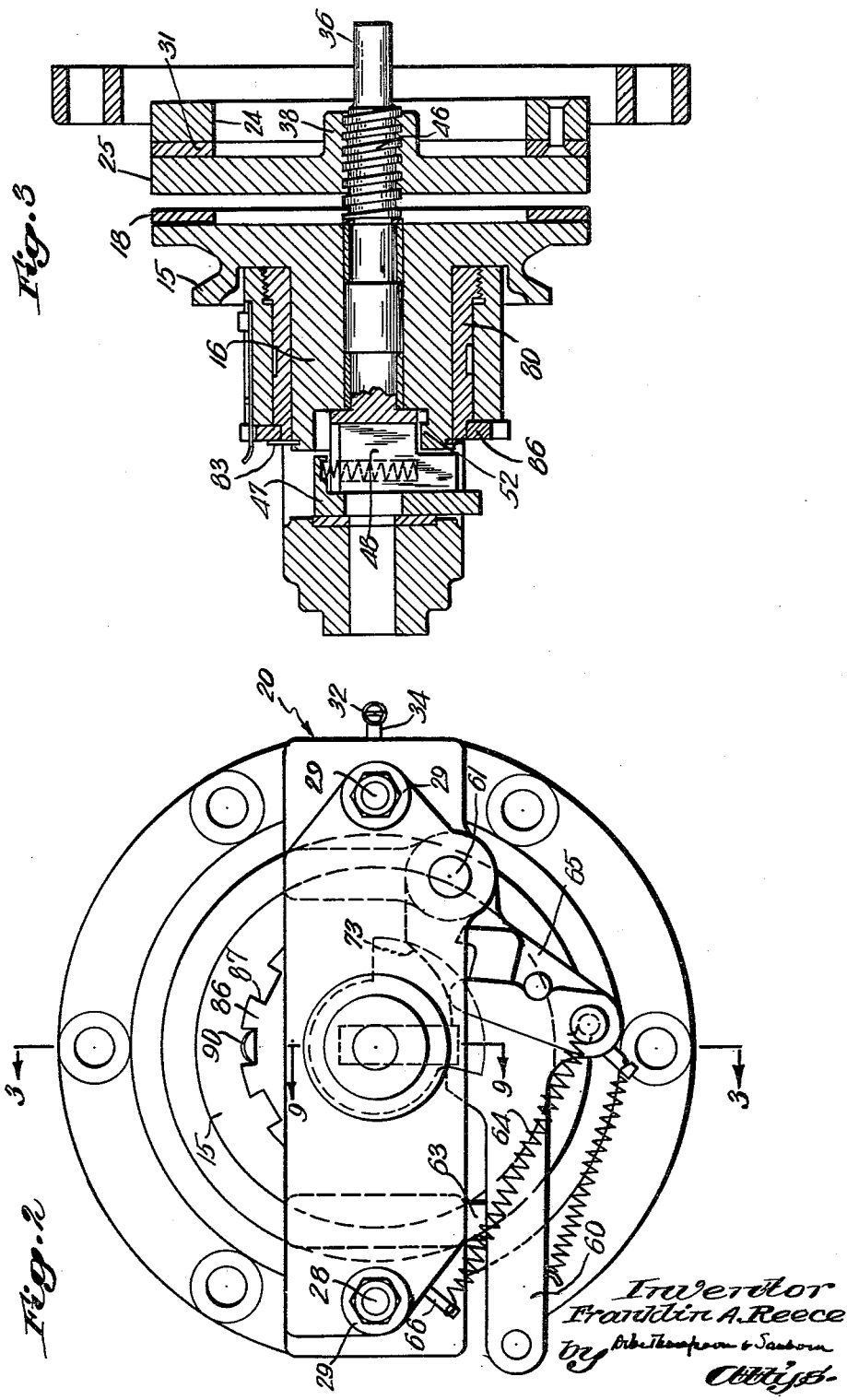

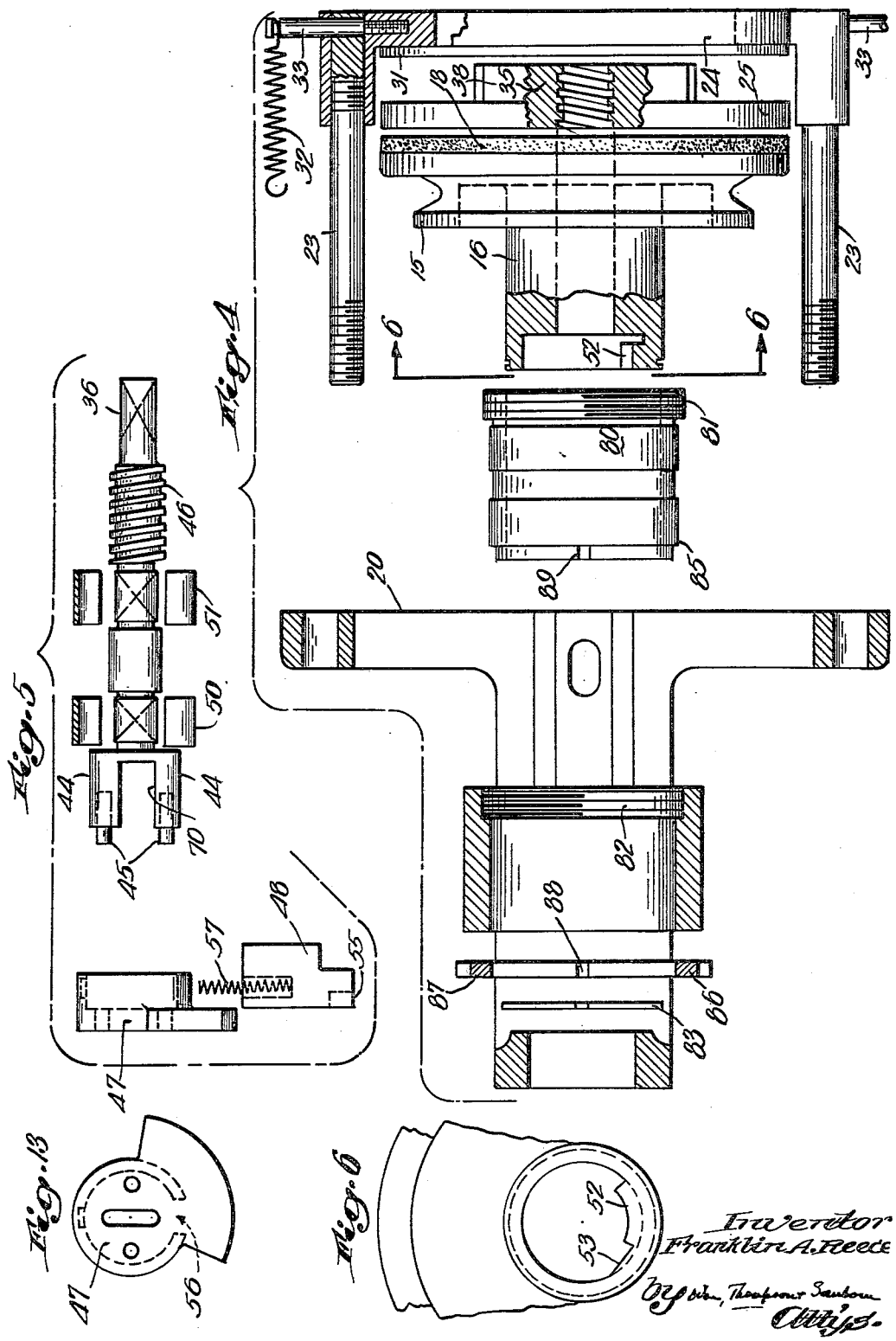

Aug. 14, 1962  F. A. REECE  3,049,209
STOP MOTION
Original Filed March 18, 1954  5 Sheets-Sheet 4
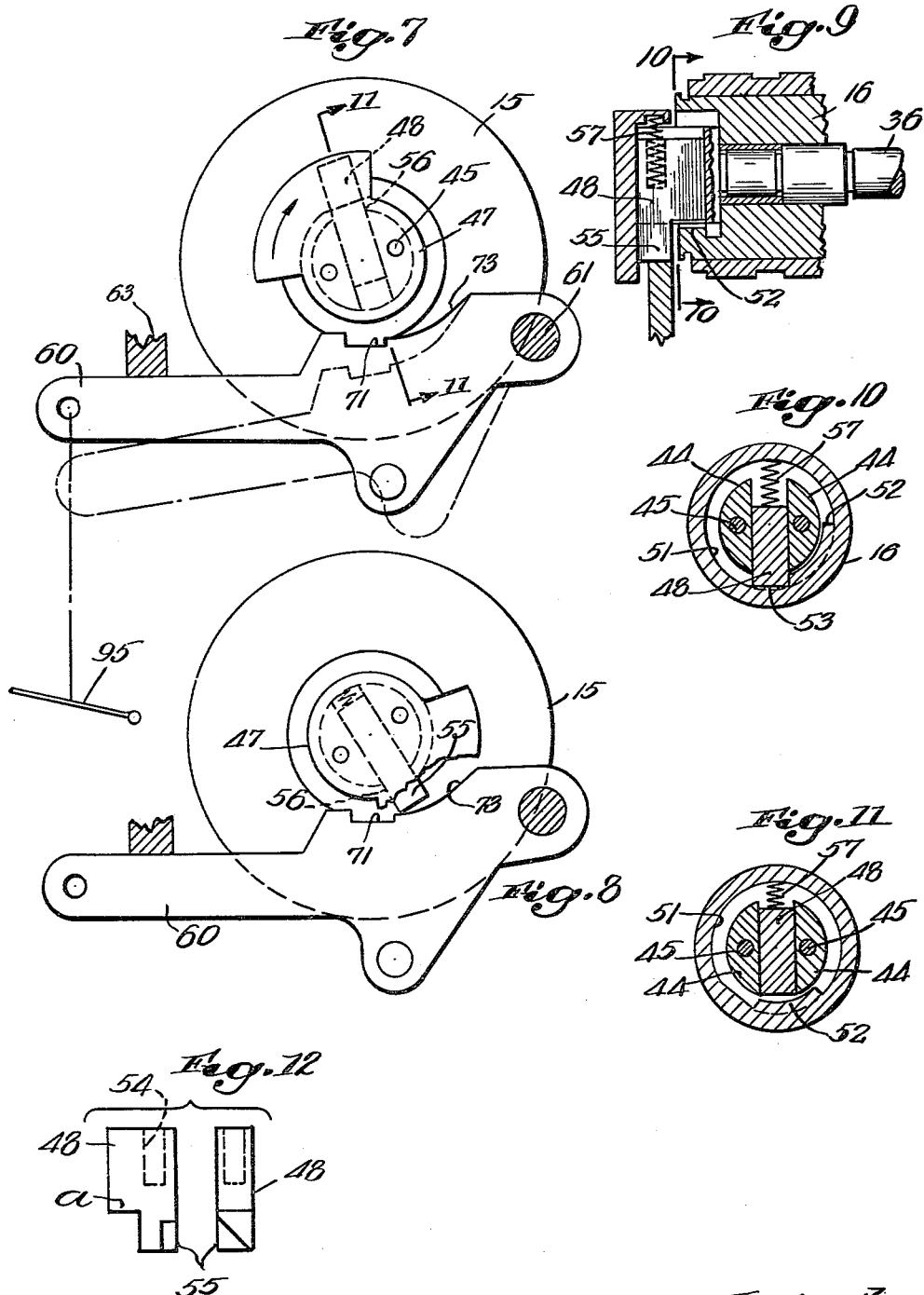

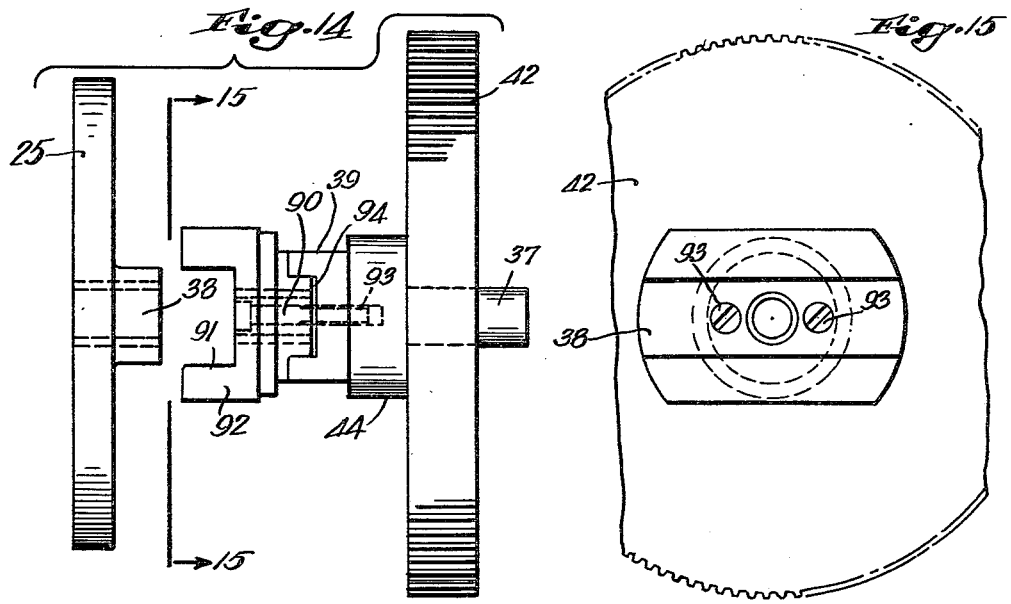
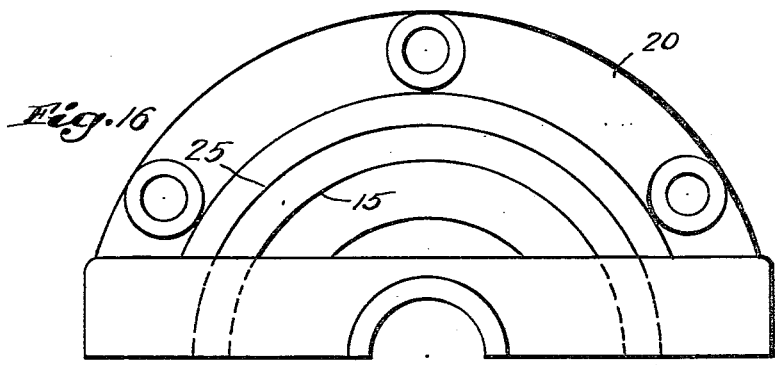
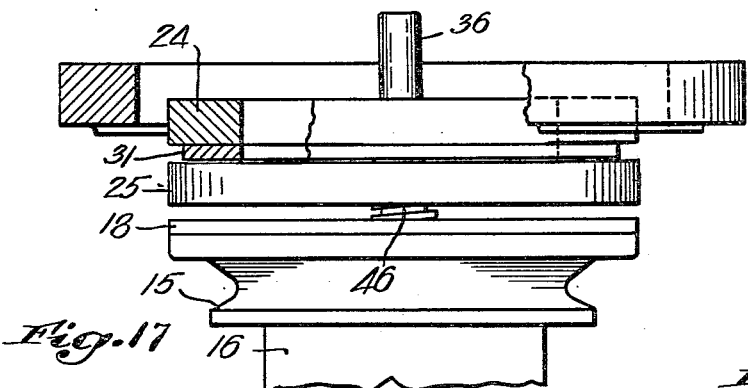

United States Patent Office 3,049,209
Patented Aug. 14, 1962

3,049,209
STOP MOTION
Franklin A. Reece, Chestnut Hill, Mass., assignor to The Reece Corporation, Boston, Mass., a corporation of Massachusetts
Continuation of application Ser. No. 417,009, Mar. 18, 1954. This application Oct. 14, 1960, Ser. No. 62,801
1 Claim. (Cl. 192—144)

The present invention has to do with mechanisms, such as are used on sewing machines of various types, particularly buttonhole and button sewing machines, to drive the machine and to stop it accurately at a predetermined point in its rotation. Heretofore a great variety of stop motions have been devised for this purpose, but, in general, they stop the machine by bringing up moving parts which may be moving with considerable speed and large rotational momentum against some obstacle and, therefore, even though cushioned with a spring, cause a serious noise and jar. Such devices cause great strains on machine parts and cause delicately timed and adjusted parts to get out of adjustment. Other devices operate by friction rather than positively and fail to stop the machine at the precise point intended. Since machines of this type are being run at higher and higher speeds, the momentum of the moving parts is correspondingly increased, and the objections resulting from the sudden positive stop are magnified.

The device embodying the present invention combines the functions of a driving clutch and a stop motion and operates by applying a locked frictional engagement between the clutch and either the driving or driven members.

The preferred form of the present invention which is described hereafter is the form in which it has been used in a button sewing machine, but it is also applicable to machines of many other types, for instance, buttonhole machines, paper box machines, clicking machines, etc. The mechanism described herein is arranged to stop the machine automatically at the end of each cycle of the machine, but it will be obvious that the stop motion may be arranged to stop the machine after a predetermined number of revolutions or even after a varying but recurring sequence of revolutions.

The stop motion embodying the present invention when embodied in a button sewing machine has been found capable of operating for millions of sewing cycles without adjustment of either the stop motion or the machine parts.

The combined stop motion and clutch is so constructed that the driving member, usually a pulley in sewing machines, is kept running all the time and is not stopped when the machine is stopped, and, if driven by a belt, the belt is never shifted but always remains on the driving wheel.

The combined stop motion and clutch includes a constantly running driving wheel having a friction surface acting as one member of a clutch, an axially yielding non-rotatable friction member or disk positively limited in the extent to which it may yield, and a clutch disk also called a center disk located between the two friction surfaces and directly connected to the machine to be stopped, said clutch or center disk being mounted in such a manner as to be axially movable by its own rotational momentum and that of the machine when released from contact with the driving wheel into contact with the friction surface of the non-rotatable yielding brake member whose yielding movement is positively limited by a non-yielding adjustable stop or stops. In practice the clutch or center disk is mounted on a worm or screw shaft, which is immovable lengthwise, and along which the clutch disk travels when the machine is stopped or started, but it is to be understood that an equivalent element may be employed.

When the machine is being driven, the center disk is in contact with the driving pulley, but when the machine is to be stopped, the rotation of the worm, screw shaft or other mounting for the center disk is first stopped and the rotational momentum of the center disk and the machine causes it to continue to rotate and shift its position along the screw shaft or other mounting, first moving out of contact with the driving member and then into contact with the yielding brake member.

As long as the clutch disk is in contact with the driving member, the parts act as a clutch, but when the clutch disk which is connected to the machine to be driven comes in contact with the yielding non-rotating brake member, the friction between the contacting surfaces increases as the brake member is pushed toward the non-yielding stops and slows the machine more and more as the friction due to the increasing pressure increases, and finally when the stops prevent further yielding, the parts are frictionally locked together. This result is obtained due to the helix angle of the worm or cam, if a cam is used. In other words, in the stop position the torque applied to rotate the machine is overcome by the frictional resistance to rotation because the helix angle of the worm or cam increases this frictional resistance until it exceeds whatever torque may be applied. This condition in which the frictional resistance increases faster than any applied turning force is conveniently termed "locked frictional engagement." This produces a locked condition between the machine and a stationary member.

When a worm or screw shaft is employed for the mounting of the clutch or center disk, the movement of the disk out of contact with the brake and into contact with the driving wheel is caused by rotation of the screw shaft while the center disk is stopped and is in contact with the stationary friction surface or brake.

The only part which is stopped or started abruptly is the screw shaft and since its mass can be made small and is concentrated closely about the axis of rotation and therefore it has little momentum, it can be stopped positively and yet transmit little or no perceptible jar to the machine since the machine itself is stopped only by the gradual application of frictional braking force.

It is found that the machine, even when running at very high speed, can be brought to a stop at a definite predetermined point without perceptible jar and that the precise stopping point can be adjusted accurately by changing the position of the stops which limit the movement of the brake member. Thus, when the device is used in a sewing machine, it is possible to stop the machine invariably with the needle retracted and out of the work.

What has been described above also applies to driving the machine. There is a rotational resistance to starting and also to driving the machine. When the machine is in stop position and the worm shaft is positively connected to the driving member, the worm shaft causes the center member to move into contact with the driving member. It is obvious that the greater the resistance to the starting and driving of the machine, the greater will be the pressure forcing the clutch disk into engagement with the driving member. Due to the helix angle of the worm, the frictional pressure between the clutch disk and the driving member increases at a faster rate than any applied resistance to the rotation of the machine so that a locked frictional engagement is obtained between the clutch disk and the driving member.

In the following specification and in the accompanying drawings the stop motion is shown and described as in a button sewing machine, this being the preferred form, but it will be understood that since the invention is believed to be a broad and fundamental one and to be capable of other embodiments, the claim is not limited to the preferred form except when expressly so stated.

The invention will be understood from the following description taken in connection with the accompanying drawings in which:

FIG. 1 is a plan view of the machine, part of the frame and bearings being shown in section.

FIG. 2 is a left-hand elevation of the machine shown in FIG. 1.

FIG. 3 is a section on line 3—3 of FIG. 2 looking in the direction of the arrows.

FIG. 4 is an exploded view of the principal operating parts.

FIG. 5 is an exploded view showing the construction of the screw shaft or worm and driving dog assembly.

FIG. 6 is an end view of the hub of the driving pulley looking in the direction indicated by the arrows on the line 6—6 of FIG. 4.

FIG. 7 is a view showing the release mechanism, the parts being in running position.

FIG. 8 is a view similar to FIG. 7 showing the position of the parts just before the machine stops.

FIG. 9 is a section on line 9—9 of FIG. 2.

FIG. 10 is a section on line 10—10 of FIG. 9 looking in the direction of the arrows and showing the parts with the driving dog out of contact with the driving lug.

FIG. 11 is similar to FIG. 10 but showing the driving dog in driving position.

FIG. 12 is a detail showing the construction of the driving dog 48.

FIG. 13 is an end view of the end plate 47.

FIG. 14 is an exploded view showing the couplings between the driving disk 25 and the main shaft of the machine.

FIG. 15 is a view on line 15—15 of FIG. 14.

FIG. 16 is an end view of the stop motion frame 20 and associated parts.

FIG. 17 is a top plan view of the parts shown in FIG. 16.

FIG. 18 is a view partly in section showing a cone-shaped friction surface which may be used in place of the flat friction 25 and 31.

Referring now to the drawings, particularly to FIGS. 1, 3 and 4, a driving pulley or wheel is shown at 15. This pulley has a hub 16 and is provided with a friction clutch face which may be a ring 18 of a suitable friction material. The pulley 15 and the friction surface 18 run continuously and are in effect one member of a friction clutch.

The driven parts of the machine of which our novel clutch and stop motion form a part, for instance, of a button sewing machine, are indicated in the drawings as a driving gear 42 and a pinion 43. The driving gear 42 is mounted on a hub 39 rotatable in a suitable bearing, for instance, a ball bearing 41, carried in a clutch and stop motion frame 20.

The pulley or driving wheel 15 cooperates with a center disk 25 which is mounted on a screw shaft or intermediate member 36 (see particularly FIG. 5), which is screw threaded as shown at 46 to mesh with screw threads cut on the inside of the bore of the center disk 25. Therefore, the center disk 25 will be moved lengthwise of the intermediate member 36 by any relative rotation of the shaft 36 and center disk 25. When the machine is being driven, the center disk 25 is in contact with the friction surface 18 of the driving pulley 15 and, when the machine is about to be stopped, the disk 25 is moved out of contact with the friction surface 18 and into contact with a non-rotating brake shoe 31, the movement of the center disk toward the brake shoe 31 being caused by stopping the rotation of the screw shaft 36 so that the continued rotation of the center disk 25 under its own momentum and that of the machine causes it to travel along the screw shaft and into frictional engagement with the non-rotating brake shoe 31.

The back or right-hand face of the center disk 25 (see FIG. 14) is provided with a key 38 received in a groove or slot 91 in a female member 92 which is itself an extension of hub 39. Surrounding the hub 39 is the ball race of a ball bearing 41 (see FIG. 1) carried by the frame 20 of the machine. The hub 39 of the driving gear is provided with a groove 94 in which is received a key 90 on female member 92 and the parts 92 and 39 are permanently fastened together by screws 93.

The key 90 and groove 94 are only for assembly purposes and do not move with relation to each other during the operation of the machine. The end of the screw shaft 36 projects into a bearing in the hub 39 of the driving gear 42, and therefore may turn independently of it. Therefore, the construction is such that when the screw shaft 36 is stopped from rotation, the center disk 25 may travel along the screw threads 46 under its own momentum and that of the machine, as will be described in detail hereafter.

A non-rotatable brake shoe 31, preferably in the shape of a disk, is mounted on a yieldable ring 24 (see particularly FIGS. 1 and 4) carried by two pins 23 slidable in holes in the clutch and stop motion frame 20. The movement of the ring 24 to the right is limited by nuts 26 which are fixed in adjusted position by check nuts 27, the extent of movement to the left is limited by the position of two adjustable studs 28, 28 screwed into lugs 29, 29 forming part of the frame 20 of the machine, these studs 28 being secured in adjusted position by check nuts 30. The ring 24 and its brake shoe 31 are held yieldingly toward the left by springs 32, 32 each having one end secured to a stud 33 projecting from the side of the ring 24 while the other end is fastened to a stud 34, projecting from the side of the clutch and stop motion frame 20.

The center disk 25 has a relatively small travel from one position to the other, so that it contacts with the brake shoe 31 almost immediately after it has moved out of contact with the rotating clutch member 18. Thereafter the ring 24 holding the brake shoe 31 yields under the pressure of the center disk 25 as it moves to the right but can move only until the nuts 26 come up against the stop motion frame 20. Thus, when the center disk 25 contacts the brake shoe 31 the friction resists the rotational torque of the center disk 25 and the machine and the momentum is gradually reduced; and finally when the nuts 26 come up against the stop motion frame 20, the resistance becomes greater than the rotational torque and the machine stops. When the center disk 25 is moved to the left as the machine is started, it remains in contact with the brake shoe 31 until the pins 23 contact with the studs 28, after which further movement of the center disk to the left brings it in contact with the revolving pulley 15 and the machine starts to move.

The mechanism by which the center disk 25 is caused to contact alternately with the clutch face 18 and the brake shoe 31 to start and stop the machine will now be described. At the left end of the screw shaft 36 (FIG. 5) is a fork, the arms 44 of which are provided with pins 45. An end plate 47 (see FIG. 13) is slipped onto the pins 45, 45 and together with the pins forms a guideway 70 for a driving dog 48 (see FIGS. 7, 8, 9, 10 and 11), which can slide at right angles to the axis of rotation of the parts. The screw shaft 36 is carried in two pairs of split bushings 50 and 51 located inside the bore of the hub 16 of the pulley 15. This hub is bored out on the left-hand face as at 49 to receive the fork 44 and a portion of a driving dog 48. On the inside of bore 49 there is a driving lug 52, adjacent to a flat inside surface 53 (see FIGS. 6 and 10) against which the driving dog rests when the machine is being driven.

The driving dog 48 is shown in detail in FIG. 12 and has in it a cylindrical hole 54 to receive the coil-spring 57 (see FIGS. 10 and 11) by which the driving dog is held normally away from the center of rotation and in the path of the driving lug 52. The driving dog 48 is also provided with a projection 55 (see FIGS. 9 and 12) which extends through an opening 56 in the rim of the end plate 47 and by which the driving dog 48 can be pushed out of the path of the driving lug 52.

This is accompished by a lever 60 (see FIGS. 2, 7 and 8) pivoted at 61 to a fixed portion of the clutch and stop motion frame 20. This lever 60 is normally held in contact with a fixed stop 63 by a spring 64, one end of which is fastened to an arm 65 of the lever 60 and the other end of which is secured to a stud 66 on a fixed part of frame 20. The lever 60 can be moved down and out of the path of the driving dog 48 by a foot pedal 95 to start the machine. The lever 60 also has a cam surface 73 (see FIG. 7) formed on it for contact with the projection 55 of the driving dog 48, and a notch 71 into which the projection 55 can drop and thereby to stop further rotation of the screw shaft 36.

Under certain conditions it may be found desirable to use interfitting cone-shaped surfaces in place of the flat driving disk 25. Such a construction is shown in FIG. 18 in which the driving member or center disk is designated 25a and the yieldable ring 24a. A cone-shaped male clutch member 96 is mounted on the driving member or center disk 25a and engages a cooperating female clutch member 97 which is mounted on the yieldable ring 24a. The operation of these parts is exactly the same as that of the parts previously described.

Assuming that the clutch and stop motion are in stopping position, the operation of the combined clutch and stop motion is as follows:

When it is desired to start the machine, the operator depresses the lever 60 by the foot pedal 95 and this allows the driving dog 48 whose projection 55 is then in contact with the upper side of lever 60 to be pushed outward by the spring 57. This brings the body of the driving dog 48 into the path of the driving lug 52 on the inside of the bore 49 in the constantly running hub 16. Thereupon the hub 16 of the revolving pulley 15 and the lug 52 rotate the fork 44 and the screw shaft 36. The center disk 25 being then stationary and in contact with the brake shoe 31, the rotation of the screw shaft 36 in the center disk 25 moves the center disk to the left as viewed in FIGS. 1 and 4. During this movement the center disk is followed by the brake shoe 31 due to the springs 32 which were stretched when the machine was previously stopped.

Contact between the center disk 25 and the brake shoe 31 ceases when the pins 23 strike the adjustable stops 28, and almost immediately thereafter the driving disk 25 contacts the friction surface 18 of the pulley 15. The movement of the driving disk 25 to the left is permitted by the key 38 (see FIG. 1) in groove 91 in the female member 92. When the driving disk 25 contacts with clutch face 18, the disk also revolves with the pulley and through the key 38 turns the driving gear 42 and operates the machine.

At the end of the cycle of operation the machine stops automatically as will now be explained. Rotation of the parts carries the projection 55 on the driving dog 48 onto the cam surface 73 on the lever 60 (see FIG. 8), after which the projection 55 rides off the cam surface 73 into the notch 71 on the lever 60 and this stops further rotation of the screw shaft 36. Since the mass of the screw shaft is concentrated about its axis of rotation, the screw shaft has little momentum and therefore there is no perceptible jar when its rotation is stopped by the driving dog 48 engaging the notch 71. However, the momentum of the machine and the center disk 25, which are both moving at the speed of the pulley at the time when the rotation of the screw shaft 36 is stopped, causes the center disk 25 to continue to rotate and this makes the center disk 25 travel along the screw shaft toward the rights, as shown in FIG. 1 and 3, until it contacts with the brake shoe 31. The brake shoe yields and moves to the right under the pressure of the center disk 25, this movement being allowed by the springs 32, and guide pins 23. When the adjusting nuts 26 on the pins 23 come up against the stop motion frame 20, the brake shoe 31 cannot yield any more. Therefore, during the movement of the center disk 25 along the screw 46, the center disk 25 and the machine are first slowed down by the increasing friction of the center disk 25 with the brake shoe 31 and the friction increases as the springs 32 are stretched, whereupon the nuts 26 strike the stop motion frame 20 and the frictional resistance to rotation increases until it exceeds the momentum torque remaining in the machine, and the parts are then in locked frictional engagement. At this point the machine is brought to a smooth gentle stop. By changing the adjustment of these nuts 26, the point at which the machine will stop can be adjusted very accurately. From long tests it has been found that once adjusted the machine will always stop within two or three degrees of the same position during hundreds of thousands of stopping movements.

This application is a continuation of my copending application Serial No. 417,009, filed March 18, 1954, now abandoned.

I claim:

In combination with a driven member forming part of a machine to be driven and stopped, a rotatable driving member, a clutch member forming part of the machine to be stopped, a non-rotatable member mounted to yield lengthwise of the axis of rotation of the rotatable driving member, said clutch member being mounted between the rotatable driving member and the non-rotatable yielding member, means limiting the yielding movement of the non-rotatable member toward and away from the driving member, said clutch member being movable into and out of alternate locked frictional engagement with the non-rotatable yielding member and the driving member, an means causing the clutch member to move by its own momentum out of engagement with the driving member and into engagement with the non-rotatable yielding member and thereby slowing the clutch member and the machine during the yielding movement and locking the clutch member and the non-rotatable yielding member against further relative angular movement with respect to each other when the yielding member is prevented from further movement by contact with the limiting means.

References Cited in the file of this patent

UNITED STATES PATENTS

| | | |
|---|---|---|
| 1,480,239 | Chaplin | Jan. 8, 1924 |
| 1,978,975 | Winans | Oct. 30, 1934 |